United States Patent
Park et al.

[11] Patent Number: 5,814,577
[45] Date of Patent: Sep. 29, 1998

[54] CATALYST AND FABRICATION METHOD OF SAME FOR PURIFYING EXHAUST GASES OF AUTOMOBILE

[75] Inventors: Sang-cheol Park; Chan-ho Pak, both of Seoul, Rep. of Korea

[73] Assignee: Samsung Electro-Mechanics Co., Ltd., Suwon, Rep. of Korea

[21] Appl. No.: 728,121

[22] Filed: Oct. 9, 1996

[30] Foreign Application Priority Data

Oct. 9, 1995 [KR] Rep. of Korea ................. 95-34572

[51] Int. Cl.⁶ .................................................. B01J 23/10
[52] U.S. Cl. ................................... 502/304; 502/302
[58] Field of Search ................................ 502/302, 304

[56] References Cited

U.S. PATENT DOCUMENTS

| | | | |
|---|---|---|---|
| 4,323,482 | 4/1982 | Stiles et al. | 502/304 |
| 4,585,752 | 4/1986 | Ernest | 502/304 |
| 4,738,947 | 4/1988 | Wan et al. | 502/304 |
| 4,868,148 | 9/1989 | Henk et al. | 502/303 |
| 5,578,283 | 11/1996 | Chen et al. | 423/246 |
| 5,597,771 | 1/1997 | Hu et al. | 502/304 |

OTHER PUBLICATIONS

CATSJ Meeting Abstract, vol. 37, No. D3, 1995, pp. 98–101.

*Primary Examiner*—Elizabeth D. Wood
*Attorney, Agent, or Firm*—Foley & Lardner

[57] ABSTRACT

A catalyst capable of purifying exhaust gases comprising an oxygen absorbing material and a carrier impregnated with a noble metal, and wherein the oxygen absorbing material comprises cobalt-cerium oxide.

16 Claims, 2 Drawing Sheets

CATALYST AND FABRICATION METHOD OF SAME FOR PURIFYING EXHAUST GASES OF AUTOMOBILE

BACKGROUND OF THE INVENTION

1. Field of the Invention

The present invention relates to a catalyst which is capable of purifying exhaust gases and a method of making catalysts. More particularly, the present invention relates to a catalyst and methods of making the same, wherein the catalyst is capable of effectively removing undesirable gases such as hydrocarbons, carbon monoxide, and nitrogen oxides ($NO_x$) from the exhaust gases of motorized vehicles such as automobiles.

2. Description of Related Art

With the increase in the number of motorized vehicles, and in particular, automobiles, air pollution due to their exhaust gases is becoming more and more serious. Accordingly, methods for purifying these exhaust gases are widely under study. Past research has been divided largely directed to fuel improvement, engine improvement, and exhaust treatment. In the case of the exhaust treatment, the use of a catalyst has proven to be the most effective.

At present, a typical catalyst for purifying the exhaust gases of an automobile is a 3-way catalyst in which a carrier is coated on a honeycomb structure. The carrier is impregnated with a noble metal such as platinum (Pt) or rhodium (Rh) and an oxygen absorbent. The 3-way catalyst shows a relatively high degree of purification for three kinds of undesirable or harmful gases, i.e., hydrocarbons, carbon monoxide and nitrogen oxides (Nox), at ideal conditions in which the air-to-fuel ratio of the engine is 14.7:1.

In greater detail, a conventional 3-way catalyst generally employs cerium oxide ($CeO_2$) as an oxygen absorbent for improving the oxidation of incomplete combustion products by absorbing oxygen from exhaust gases, and releasing the absorbed oxygen as activated oxygen. However, cerium oxide does not have a very high absorbing capacity for oxygen and thus a 3-way catalyst employing cerium oxide exhibits relatively low purification efficiency for carbon monoxide and hydrocarbons.

SUMMARY OF THE INVENTION

With a view to reducing or eliminating the above problem, an object of the present invention is to provide a catalyst having a high absorption capacity for oxygen that is capable of effectively purifying hydrocarbons and carbon monoxide in exhaust gases such as those produced by a motorized vehicle such as an automobile.

Another object of the present invention is to provide a method of making a catalyst.

In accordance with these and other objects, there is provided a catalyst capable of purifying exhaust gases comprising an oxygen absorbing material and a noble metal which is impregnated into a carrier, and wherein said oxygen absorbing material comprises cobalt-cerium oxide.

In further accordance with these objectives, there is also provided a method for preparing a catalyst that is capable of purifying exhaust gases comprising:

(a) preparing a cobalt-cerium oxide by calcining a mixture of a cobalt compound and a cerium compound at a temperature from 600° to 750° C. in the air, and thermally treating the resultant at a temperature from 1,000° to 1,200° C. in the air;

(b) mixing said cobalt-cerium oxide, and a carrier which is impregnated with a noble metal in a binder to obtain a slurry;

(c) washcoating said slurry on a honeycomb structure; and (d) air-blowing, drying and thermally treating said slurry-coated honeycomb structure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1A:
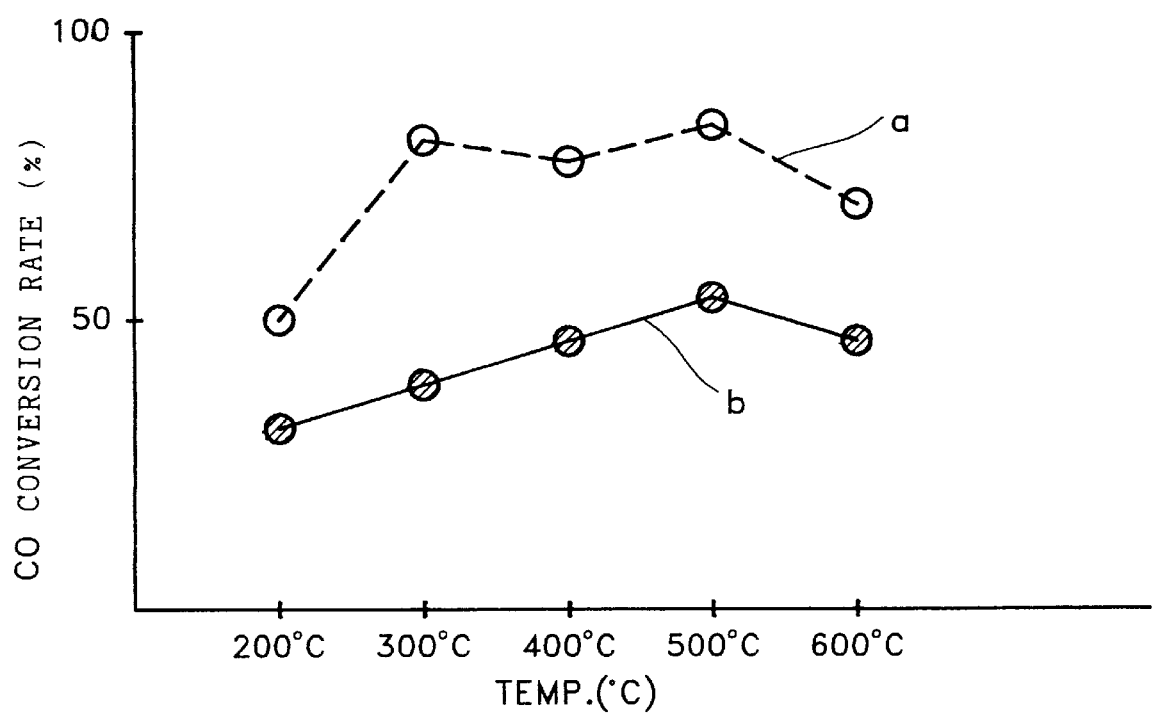
FIGS. 1A through 1C are graphs showing the conversion rate for carbon monoxide (CO), propylene ($C_3H_6$), and nitric oxide (NO). The accompanying drawings, which are incorporated in and constitute a part of the specification, illustrate a presently preferred embodiment of the invention, and, together with the general description given above and the detailed description of the preferred embodiment given below, serve to explain the principles of the invention.

In accordance with the present invention, there is provided a catalyst that is capable of purifying exhaust gases, such as those produced by an automobile, comprising an oxygen absorbing material and a noble metal. The present catalyst is capable of being used in any environment where undesirable gases may be present. The noble metal is impregnated into a carrier, and the oxygen absorbing material comprises cobalt-cerium oxide.

There is also provided a method of preparing a catalyst for purifying exhausts, such as those from an automobile, comprising the steps of: preparing a cobalt-cerium oxide by calcining a mixture of a cobalt compound and a cerium compound at a temperature from 600° to 750° C. in the air, and thermally treating the resultant at a temperature from 1,000° to 1,200° C. in the air. Then, the prepared cobalt-cerium oxide, and the carrier which is impregnated with a noble metal are mixed, optionally in the presence of one or more binders to obtain a slurry. The slurry is coated on a honeycomb structure, and then the slurry-coated honeycomb is subjected to blowing, drying and a thermal treatment.

A catalyst according to the present invention has an improved absorbing capacity for oxygen as compared to catalysts prepared using cerium oxide due to the inclusion of a cobalt-cerium oxide. Inter alia, the incorporation of a cobalt-cerium oxide as an oxygen absorbing material improves the purification efficiency of the catalyst for carbon monoxide and hydrocarbons while maintaining a high purification efficiency for nitrogen oxides. Carbon monoxide, hydrocarbons, and nitrogen oxides are exemplary undesirable gases produced in the exhaust of motorized vehicles such as automobiles.

A preferred catalyst possesses a high absorbing capacity for oxygen and is thus capable of effectively purifying hydrocarbons and carbon monoxide in exhaust gases of an automobile.

Hereinafter, the present invention will be explained in detail through a preferred method of producing a catalyst. First, a cobalt compound such as cobalt oxide ($CO_3O_4$), or cobalt carbonate ($COCO_3$) and a cerium compound such as cerium oxide ($CeO_2$), or cerium (III) carbonate oxahydrate [$Ce_2(CO_3)_3.8H_2O$] are mixed. The mixture is calcined in the air, and then thermally heated to form cobalt-cerium oxide powder. It is desirable, although not required, that either one of the cobalt compound and/or the cerium compound is a salt. Also, the calcination is preferably performed at temperatures from 600° to 750° C. for 3–6 hours and the thermal treatment is preferably conducted at temperatures from 1000° to 1200° C. for 2–4 hours. In particular, the molar ratio of the cobalt compound and the cerium compound is preferably 1:1 on the basis of cobalt and cerium, by which $CoCeO_3$ is obtained.

Meanwhile, the obtained cobalt-cerium oxide, and a carrier impregnated with an active noble metal are mixed in a binder to form a slurry. The cobalt-cerium oxide, and the carrier may be put through the process of ballmilling, if needed. The nature of the active noble metal is not particularly limited. However, in a preferred embodiment, it is desirable that the active noble metal comprise platinum (Pt), rhodium (Rh) or palladium (Pd), and the carrier is alumina, most preferably γ-alumina.

It is particularly desirable that the cobalt-cerium oxide be present in an amount from 10–25 weight % based on the weight of the carrier. Moreover, it is preferable that the active noble metal be present in an amount from 0.1 to 5 weight % based on the weight of the carrier.

In accordance with the present method, the slurry is washcoated on a honeycomb structure, and air-blowing and drying is preferably repeated until the ratio of slurry to the honeycomb structure is 15 to 50 weight %. After coating, drying is performed at temperatures from 200° to 250° C. for 2–4 hours. Finally, the coated honeycomb structure is thermally treated to obtain the catalyst according to the present invention. It is desirable that the thermal treatment is performed at temperatures from 400° to 500° C. for 2–5 hours.

The present invention will be described below in greater detail with reference to following examples and comparative examples.

EXAMPLE 1

11.89 g of cobalt carbonate ($COCO_3$) and 17.21 g of cerium oxide ($CeO_2$) were mixed and the mixture was calcined at 700° C. in the air for five hours. The resultant mixture was subjected to ballmilling in a mortar, and then was thermally treated at 1100° C. for three hours in the air to obtain a cobalt-cerium oxide.

Using AMI-1 (Altamik Instrument Co.), the temperature programmed reduction (TPR) peak area of the cobalt-cerium oxide to oxygen was measured to be very large, that is, 205,230, as shown in Table 1. Here, it is noted that a larger TPR peak area indicates large absorbing capacity for oxygen.

EXAMPLE 2

Cobalt-cerium oxide was obtained in the same manner as Example 1, except that 3.02 g of cerium (III) carbonate oxahydrate [$Ce_2(CO_3)_3.8H_2O$] was used instead of 17.21 g of cerium oxide ($CeO_2$). The TPR peak area of the cobalt-cerium oxide was measured to be large, that is, 170,530.

EXAMPLE 3

Cobalt-cerium oxide was obtained in the same manner as Example 1, except that 3.02 g of cerium (III) carbonate oxahydrate [$Ce_2(CO_3)_3.8H_2O$] was used instead of 17.21 g of cerium oxide ($CeO_2$) and 0.80 g of cobalt oxide ($Co_3O_4$) was used instead of 11.89 g of cobalt carbonate ($COCO_3$). The TPR peak area of the cobalt-cerium oxide was measured to be large, that is, 139,570.

EXAMPLE 4

Cobalt-cerium oxide was obtained in the same manner as Example 1, except that 0.8 g of cobalt oxide ($Co_3O_4$) (Japanese Kanto Chemicals Co.) was used instead of 11.89 g of cobalt carbonate ($COCO_3$). The TPR peak area of the cobalt-cerium oxide was measured to be still large, that is, 111,810.

COMPARISON 1

17.21 g of cerium oxide alone was treated according to the parameters outlined in Example 1, and the TPR thereof was measured. The TPR value was 6,990, as shown in Table 1, which is very small when compared with that of the oxygen absorbing material obtained in the examples.

COMPARISON 2

17.21 g of cerium oxide was thermally treated at 1100° C. for three hours and the TPR thereof was measured. The TPR value was 3,950, as shown in Table 1, which is even smaller than the oxygen absorbing material given in Comparison 1.

TABLE 1

|     | Ex. 1   | Ex. 2   | Ex. 3   | Ex. 4   | Comp. 1 | Comp. 2 |
| --- | ------- | ------- | ------- | ------- | ------- | ------- |
| TPR | 205,230 | 170,530 | 139,570 | 111,810 | 6,990   | 3,950   |

As shown in Table 1, the absorbing capacity for oxygen of a cobalt-cerium oxide according to the present invention is superior to that of the conventional cerium oxide. Thus, a catalyst employing the cobalt-cerium oxide as an oxygen absorbing material is effective for improving purification efficiency for undesirable or harmful exhaust gases.

EXAMPLE 5

13.3 g of the prepared cobalt-cerium oxide ($CoCeO_3$) obtained from Example 1, 1.05 g of Pt was impregnated into 68.95 g of $Al_2O_3$, 180 g of alumina sol ($Al_2O_3$: 20 wt % included), and 160 g of water were mixed and subjected to ballmilling in a mortar to form a slurry. The slurry was coated on a honeycomb structure (400 cells/in$^2$), air-blown, and dried for two hours at 200° C. in the air. Finally, the coated honeycomb was subjected to a thermal treatment at 400° C. for two hours to produce a catalyst according to an embodiment of the present invention.

Figure 1B:
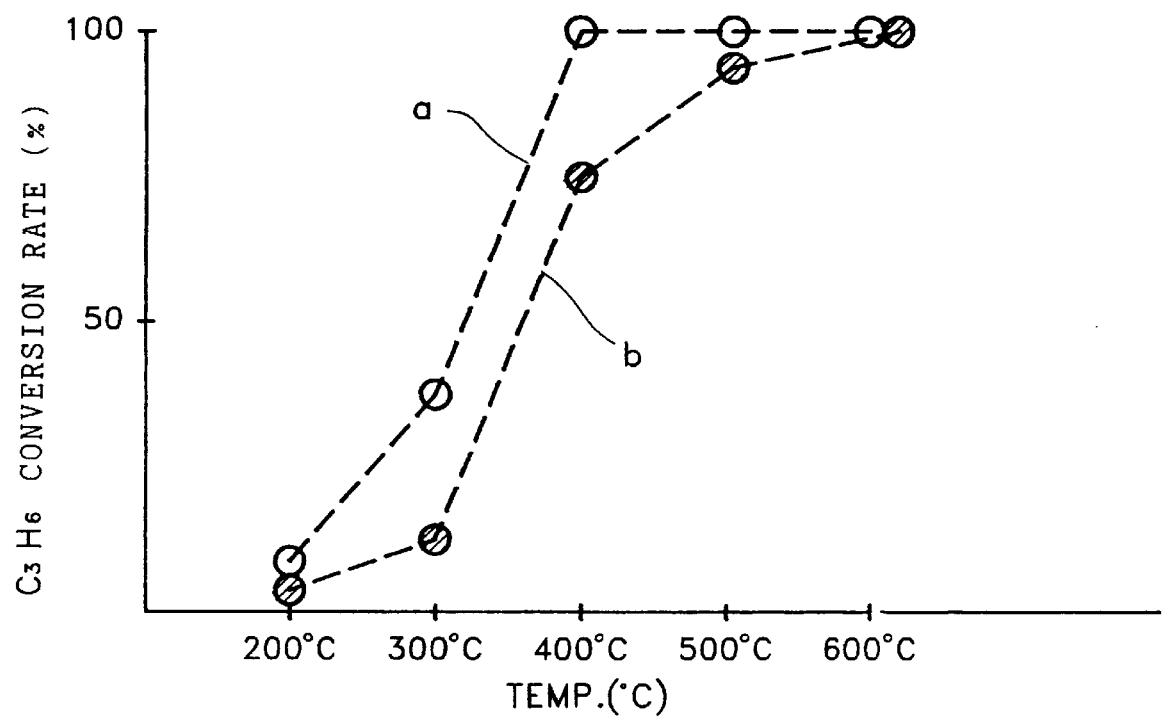
Figure 1C:
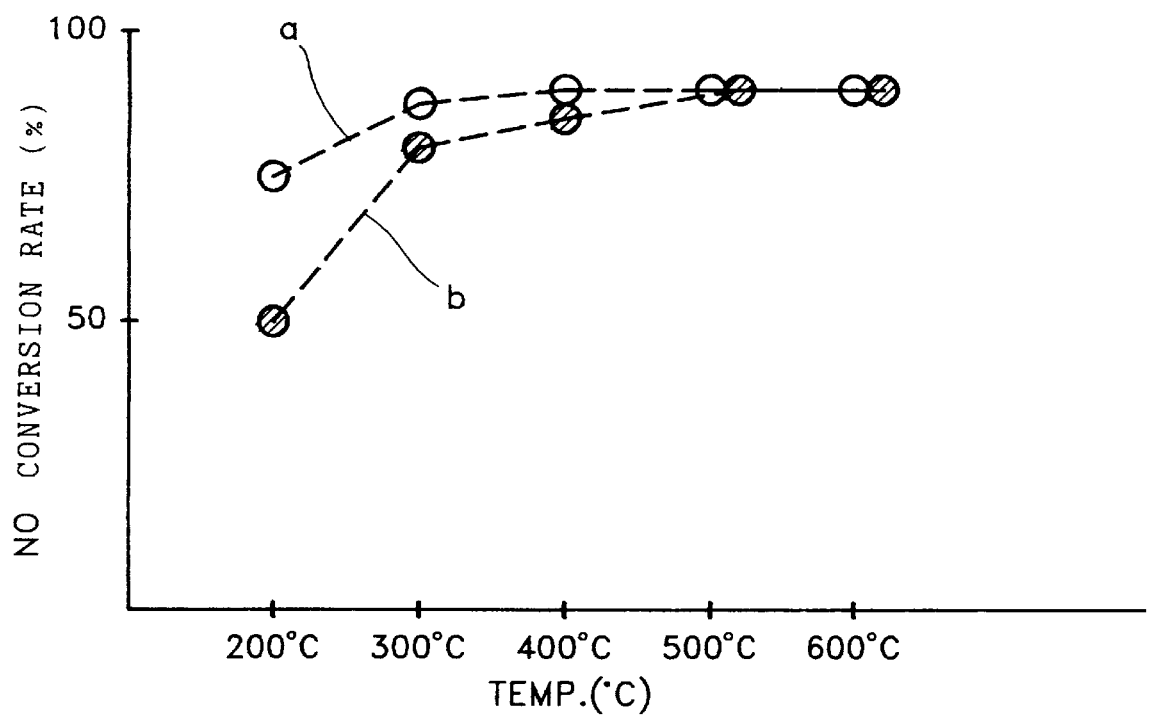

The prepared catalyst was put into a fixed-bed flow reactor through which an exhaust gas including $C_3H_6$ (500 ppm), NO (1000 ppm), CO (1.0%), $CO_2$ (14%), $H_2O$ (1%), $O_2$ (0.5%) were passed, and the conversion rate (%) for carbon monoxide, propylene, and nitric oxide existing in the exhaust gas were measured. FIGS. 1A through 1C show the respective results by line a. Here, the reaction conditions were controlled such that the space velocity was 40,000 h$^{-1}$ and the temperature was gradually increased from 200° C. to 500° C.

COMPARISON 3

A catalyst was fabricated in the same manner as the Example 5, except that 13.3 g of cerium oxide $CeO_2$ was used instead of 13.3 g of $CoCeO_3$ as an oxygen absorbing material, and the conversion rate for carbon monoxide, propylene, and nitric oxide were measured. The respective results are shown in FIGS. 1A through 1C by line b.

As shown in FIGS. 1A through 1C, the purification ratios for carbon monoxide, propylene, and nitric oxide are higher when cobalt-cerium oxide is employed as an oxygen absorbing material rather than cerium oxide.

Although, FIG. 1C shows the purification ratio for Nitric oxide (NO), the catalyst of the present invention is also effective to purify other nitrogen oxides (Nox).

As described above, a catalyst according to the present invention is effective for purifying not only nitrogen oxides but also carbon monoxide and hydrocarbons from the exhaust streams of motor vehicles such as automobiles, or other exhausts possessing such undesirable or harmful gases.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A catalyst comprising an oxygen absorbing material and a carrier impregnated with a noble metal, wherein said oxygen absorbing material comprises a cobalt-cerium oxide compound.

2. A catalyst as claimed in claim 1, wherein said oxygen absorbing material is present in an amount from 10 to 25% by weight based on the weight of said carrier.

3. A catalyst as claimed in claim 1, wherein said cobalt-cerium oxide is $CoCeO_3$.

4. A catalyst as claimed in claim 1, wherein said carrier is γ-alumina.

5. A catalyst as claimed in claim 1, wherein said noble metal comprises at least one metal selected from the group consisting of platinum, rhodium and palladium.

6. A catalyst as claimed in claim 1, said noble metal is present in an amount from 0.1 to 5% by weight based on the weight of said carrier.

7. A method for preparing a catalyst comprising:
(a) preparing a cobalt-cerium oxide compound by (i) calcining a mixture of a cobalt compound and a cerium compound at a temperature from 600° to 750° C. in the air, and (ii) thermally treating the resultant mixture at a temperature from 1,000° to 1,200° C. in air;
(b) mixing said cobalt-cerium oxide, and a carrier which is impregnated with a noble metal in a binder to obtain a slurry;
(c) washcoating said slurry on a honeycomb structure; and
(d) air-blowing, drying and thermally treating said slurry-coated honeycomb structure.

8. A method as claimed in claim 7, wherein said calcination of said step (a)(i) is performed for 3–6 hours, and wherein said thermal treatment of step (a)(ii) is performed for 2–4 hours.

9. A method as claimed in claim 7, wherein said carrier is γ-alumina.

10. A method as claimed in claim 7, wherein said noble metal comprises at least one metal selected from the group consisting of platinum, rhodium and palladium.

11. A method as claimed in claim 7, wherein said cobalt-cerium oxide is present in said catalyst in an amount from 10 to 25% by weight based on the weight of said carrier.

12. The method as claimed in claim 7, wherein said drying in said step (d) is performed at a temperature from 200° to 250° C. for 2 to 4 hours.

13. A method as claimed in claim 7, wherein said thermal treatment in said step (d) is performed at a temperature from 400° to 500° C. in air for 2 to 5 hours.

14. A catalyst prepared by the method according to claim 7.

15. A catalyst as claimed in claim 14, wherein the cobalt-cerium oxide is $CoCeO_3$.

16. A method as claimed in claim 7, wherein the cobalt-cerium oxide is $CoCeO_3$.

* * * * *